(12) United States Patent
Shi et al.

(10) Patent No.: US 12,100,040 B2
(45) Date of Patent: Sep. 24, 2024

(54) METHOD FOR INFORMATION PROCESSING AND ELECTRONIC DEVICE

(71) Applicant: PATEO CONNECT+ Technology (Shanghai) Corporation, Shanghai (CN)

(72) Inventors: Hongren Shi, Shanghai (CN); Xiaotong Li, Shanghai (CN)

(73) Assignee: PATEO CONNECT + Technology (Shanghai) Corporation, Shanghai (CN)

( * ) Notice: Subject to any disclaimer, the term of this patent is extended or adjusted under 35 U.S.C. 154(b) by 189 days.

(21) Appl. No.: 17/832,087

(22) Filed: Jun. 3, 2022

(65) Prior Publication Data

US 2022/0301046 A1   Sep. 22, 2022

Related U.S. Application Data

(63) Continuation of application No. PCT/CN2019/130647, filed on Dec. 31, 2019.

(30) Foreign Application Priority Data

Dec. 4, 2019   (CN) .......................... 201911227016.5

(51) Int. Cl.
*G06Q 30/00* (2023.01)
*B60R 25/24* (2013.01)
(Continued)

(52) U.S. Cl.
CPC ......... *G06Q 30/0645* (2013.01); *B60R 25/24* (2013.01); *B60R 25/25* (2013.01)

(58) Field of Classification Search
None
See application file for complete search history.

(56) References Cited

U.S. PATENT DOCUMENTS

| 2011/0087433 | A1* | 4/2011 | Yester | G08G 1/096716 |
| | | | | 701/469 |
| 2012/0016581 | A1* | 1/2012 | Mochizuki | G08G 1/167 |
| | | | | 701/301 |

(Continued)

FOREIGN PATENT DOCUMENTS

| CN | 102163312 A | 8/2011 |
| CN | 105606112 A | 5/2016 |

(Continued)

*Primary Examiner* — Matthew T Sittner
(74) *Attorney, Agent, or Firm* — AP3 Law Firm PLLC

(57) ABSTRACT

A method for information processing and an electronic device are provided. At a server, a first vehicle-exchange request of a first user is received from a first electronic device, where the first vehicle-exchange request includes first exchange-target-vehicle-type-information. A second vehicle-exchange request of a second user is received at the server from a second electronic device, where the second vehicle-exchange request includes second exchange-target-vehicle-type-information. When a first vehicle of the first user matches the second exchange-target-vehicle-type-information, and a second vehicle of the second user matches the first exchange-target-vehicle-type-information, information of the second user and the second vehicle is transmitted to the first electronic device, and information of the first user and the first vehicle is transmitted to the second electronic device.

20 Claims, 6 Drawing Sheets

(51) Int. Cl.
*B60R 25/25* (2013.01)
*G06Q 30/0645* (2023.01)

(56) References Cited

U.S. PATENT DOCUMENTS

| | | | | |
|---|---|---|---|---|
| 2013/0080019 | A1* | 3/2013 | Isaji | B60W 30/16 |
| | | | | 701/96 |
| 2014/0219508 | A1* | 8/2014 | Gunter | B60R 25/2045 |
| | | | | 382/104 |
| 2016/0078688 | A1 | 3/2016 | Behr et al. | |
| 2016/0099927 | A1* | 4/2016 | Oz | G07C 5/0808 |
| | | | | 726/9 |
| 2016/0209224 | A1 | 7/2016 | Dickow et al. | |
| 2017/0249792 | A1* | 8/2017 | Gennermann | B60R 25/241 |
| 2017/0345228 | A1* | 11/2017 | Dibb | H04W 4/44 |
| 2018/0281657 | A1* | 10/2018 | Healey | G06Q 30/06 |
| 2018/0328734 | A1* | 11/2018 | Kasslatter | G01C 21/30 |
| 2019/0266531 | A1* | 8/2019 | Umeda | G06Q 10/06312 |
| 2019/0287407 | A1* | 9/2019 | Branscombe | G08G 1/161 |
| 2020/0020016 | A1* | 1/2020 | Li | G06F 16/00 |
| 2021/0064877 | A1* | 3/2021 | Ramasamy | G06Q 50/40 |

FOREIGN PATENT DOCUMENTS

| | | | |
|---|---|---|---|
| CN | 105701701 | A | 6/2016 |
| CN | 105825702 | A | 8/2016 |
| CN | 106372993 | A | 2/2017 |
| CN | 107481077 | A | 12/2017 |
| CN | 108189804 | A | 6/2018 |
| CN | 110119970 | A | 8/2019 |
| CN | 110322725 | A | 10/2019 |
| TW | 201310374 | A | 3/2013 |

* cited by examiner

METHOD FOR INFORMATION PROCESSING AND ELECTRONIC DEVICE

CROSS-REFERENCE TO RELATED APPLICATIONS

This application is a continuation of International Application No. PCT/CN2019/130647, filed Dec. 31, 2019, which claims priority to Chinese Patent Application No. 201911227016.5, filed Dec. 4, 2019, the entire disclosures of which are hereby incorporated by reference.

TECHNICAL FIELD

This disclosure relates to the field of information processing, and more particularly to a method for information processing and an electronic device.

BACKGROUND

Traditionally, a platform for vehicle rental is provided, in which users are eligible to use vehicles by paying deposit. However, in this case, the user generally needs to arrive at a rental point to rent the vehicle and the rental point is generally remote, which is inconvenient. In addition, the vehicle rental is conducted by exchanging a physical key, which is cumbersome and quite unsafe.

SUMMARY

Implementations of the disclosure provide a method for information processing, a server, an electronic device, and a non-transitory computer-readable storage medium, which can achieve matching of vehicle-exchange requirements based on vehicle types, and meet the vehicle-exchange requirements of users, thereby improving user experience.

According to a first aspect of the disclosure, a method for information processing is provided. The method includes the following. At a server, a first vehicle-exchange request of a first user is received from a first electronic device, where the first vehicle-exchange request includes first exchange-target-vehicle-type-information. A second vehicle-exchange request of a second user is received from a second electronic device, where the second vehicle-exchange request includes second exchange-target-vehicle-type-information. Determine whether a first vehicle of the first user matches the second exchange-target-vehicle-type-information and a second vehicle of the second user matches the first exchange-target-vehicle-type-information. Information of the second user and information of the second vehicle are transmitted to the first electronic device and information of the first user and information of the first vehicle are transmitted to the second electronic device, in response to determining that the first vehicle of the first user matches the second exchange-target-vehicle-type-information and the second vehicle of the second user matches the first exchange-target-vehicle-type-information.

According to a second aspect, a server is provided. The server includes at least one processing unit and at least one memory. The at least one memory is coupled with the at least one processing unit and stores instructions configured to be executed by the at least one processing unit. When executed by the at least one processing unit, the instructions cause the server to: receive, at a server, a first vehicle-exchange request of a first user from a first electronic device, where the first vehicle-exchange request includes first exchange-target-vehicle-type-information; receive a second vehicle-exchange request of a second user from a second electronic device, where the second vehicle-exchange request includes second exchange-target-vehicle-type-information; determine whether a first vehicle of the first user matches the second exchange-target-vehicle-type-information and a second vehicle of the second user matches the first exchange-target-vehicle-type-information; transmit information of the second user and information of the second vehicle to the first electronic device and transmit information of the first user and information of the first vehicle to the second electronic device, in response to determining that the first vehicle of the first user matches the second exchange-target-vehicle-type-information and the second vehicle of the second user matches the first exchange-target-vehicle-type-information.

According to a third aspect, a non-transitory computer-readable storage medium is provided. The non-transitory computer-readable storage medium stores a computer program. When executed by a machine, the computer program causes the machine to implement any of operations of the method of the first aspect.

According to a fourth aspect, a method for information processing is provided. The method includes the following. At an electronic device, a vehicle-exchange request is transmitted to a server, where the vehicle-exchange request includes exchange-target-vehicle-type-information. Information of a target vehicle and information of a target user are received from the server, where the target vehicle matches the exchange-target-vehicle-type-information.

According to a fifth aspect, an electronic device is provided. The electronic device includes at least one processing unit and at least one memory. The at least one memory is coupled with the at least one processing unit and stores instructions configured to be executed by the at least one processing unit. When executed by the at least one processing unit, the instructions cause the electronic device to: transmit, at an electronic device, a vehicle-exchange request to a server, where the vehicle-exchange request includes exchange-target-vehicle-type-information; receive, from the server, information of a target vehicle and information of a target user, where the target vehicle matches the exchange-target-vehicle-type-information.

According to a sixth aspect, a non-transitory computer-readable storage medium is provided. The non-transitory computer-readable storage medium stores a computer program. When executed by a machine, the computer program causes the machine to implement any of operations of the method of the fourth aspect.

The summary is provided to introduce concepts of the disclosure in a simplified form, which will be further described in the following detailed description. The summary does not intend to identify key features or essential features of the disclosure, nor does it intend to limit the scope of the disclosure.

BRIEF DESCRIPTION OF THE DRAWINGS

The foregoing and other objects, features, and advantages of the disclosure will become more apparent through a more detailed description of exemplary implementations of the disclosure in conjunction with the accompanying drawings. In the exemplary implementations of the disclosure, same reference numerals generally represent the same components.

In various figures, the same or corresponding numerals represent the same or corresponding parts.

DETAILED DESCRIPTION OF ILLUSTRATIVE EMBODIMENTS

Figure 1:
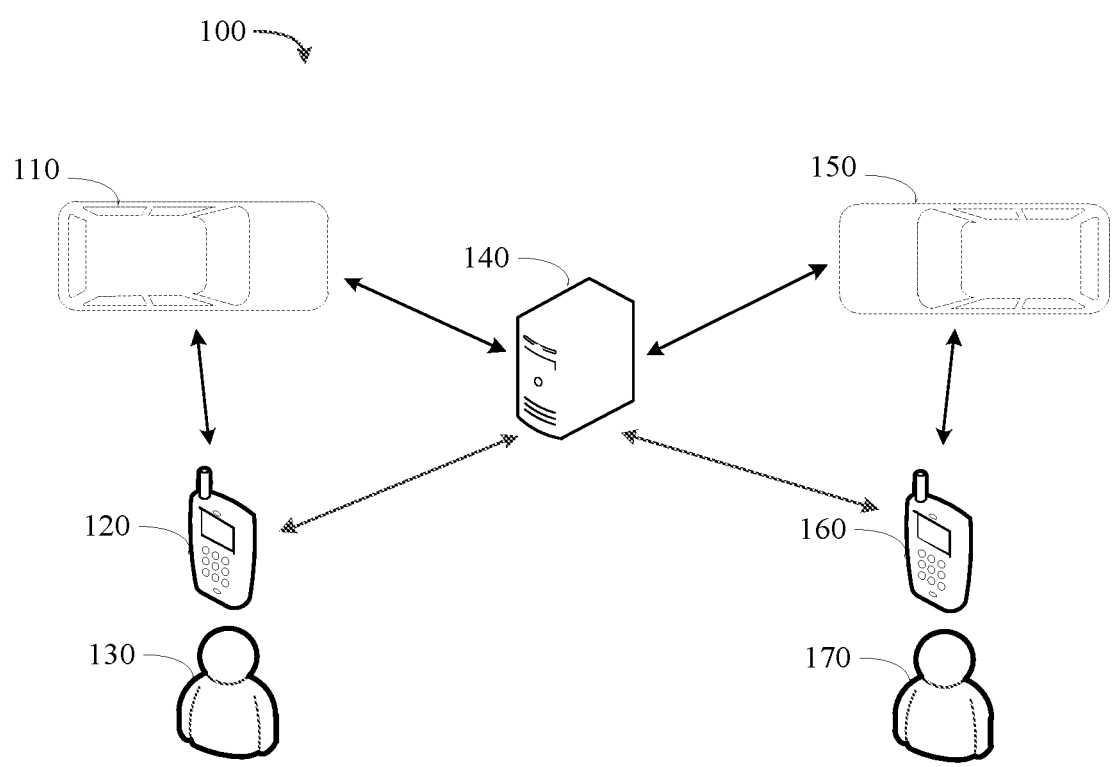
FIG. 1 is a schematic diagram illustrating an exemplary information processing environment 100 according to example implementations of the disclosure.

Various implementations of the disclosure will be described in more details with reference to the drawings. Although the drawings illustrate the implementations of the disclosure, it should be appreciated that the disclosure can be implemented in various manners and should not be limited to the implementations explained herein. On the contrary, the implementations are provided to make the disclosure more thorough and complete and to fully convey the scope of the disclosure to those skilled in the art.

As used herein, the term "include/comprise" and its variants are to be read as open-ended terms that mean "include, but not limited to." The term "or" is to be read as "and/or" unless the context clearly indicates otherwise. The term "based on" is to be read as "at least based on in part." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

At present, "shared mobility" generally adopts a business to customer (B2C) mode, in other words, providers for the shared mobility put a large number of bicycles or vehicles on the market for people in need to use, which fails to effectively solve sharing requirements of a large number of individual users. Specifically, for an individual having one type of vehicle wants to experience another type of vehicle in the form of vehicle exchange, there is no mechanism to solve the problem of vehicle exchange for such user.

To at least partially solve one or more of the above problem and other potential problems, exemplary implementations of the disclosure provide a scheme for information processing. In this scheme, at the server, a first vehicle-exchange request of a first user is received from a first electronic device, where the first vehicle-exchange request includes first exchange-target-vehicle-type-information. A second vehicle-exchange request of a second user is received from a second electronic device, where the second vehicle-exchange request includes second exchange-target-vehicle-type-information. Determine whether a first vehicle of the first user matches the second exchange-target-vehicle-type-information and a second vehicle of the second user matches the first exchange-target-vehicle-type-information. In response to determining that the first vehicle of the first user matches the second exchange-target-vehicle-type-information and the second vehicle of the second user matches the first exchange-target-vehicle-type-information, information of the second user and information of the second vehicle are transmitted to the first electronic device and information of the first user and information of the first vehicle are transmitted to the second electronic device.

As a result, it is possible to achieve matching of vehicle-exchange requirements based on vehicle types, and meet the vehicle-exchange experience of users, thereby improving user experience.

In the following, specific examples of the scheme will be described in detail in conjunction with accompanying drawings.

FIG. 1 is a schematic diagram illustrating an exemplary information processing environment 100 according to implementations of the disclosure. The information processing environment 100 involves a first vehicle no, a first electronic device 120, a first user 130, a server 140, a second vehicle 150, a second electronic device 160, and a second user 170.

The first vehicle no includes at least an in-vehicle electronic device and a communication module.

The in-vehicle electronic device may be, but is not limited to, an in-vehicle computer, an in-vehicle controller, and so on. The in-vehicle electronic device includes at least a processor and a memory. The memory is configured to store one or more computer programs. The processor is coupled with the memory and is configured to execute the one or more computer programs to cause the in-vehicle electronic device to achieve one or more functions. In some implementations, the in-vehicle electronic device may further include or be coupled with an in-vehicle display, to allow display of related interfaces.

The communication module, such as a telematics BOX (T-BOX), may communicate with at least one of the first electronic device 120 or the server 140. In some implementations, the communication module may include a direct communication module, which can be in a direct communication connection with the first electronic device 120. For example, the direct communication module may communicate with the first electronic device 120 via any direct communication technology, such as Bluetooth, wireless fidelity (Wi-Fi), Zigbee, near field communication (NFC), or universal serial bus (USB). In some implementations, the in-vehicle electronic device may receive a vehicle control instruction from the first electronic device 120 via the direct communication module. For example, the in-vehicle electronic device may receive an unlock instruction for a virtual Bluetooth key from the first electronic device 120 via a Bluetooth module, so as to unlock the vehicle.

Alternatively or additionally, the communication module may include a cellular communication module, which is configured to communicate with at least one of the first electronic device 120 or the server 140 via a cellular network. For example, the cellular communication module may communicate with at least one of the first electronic device 120 or the server 140 via any cellular communication technology, such as 5th generation (5G), long term evolution (LTE), evolution-data only/evolution-data optimized (EVDO), code division multiple access (CDMA), general packet radio service (GPRS), and enhanced data rate for GSM evolution (EDGE).

In some implementations, the first electronic device 120 may have wireless transceiving capabilities and can be able to access to the Internet. The first electronic device 120 may be, for example, but not limited to, a mobile phone, a smart phone, a laptop computer, a tablet computer, a personal digital assistant (PDA), a wearable device, or the like.

In some implementations, the first electronic device 120 may include at least a communication module, a memory, and a processor. The communication module is configured to communicate with at least one of the first vehicle no or the server 140. The communication module in the first electronic device 120 is similar to that in the first vehicle no, which are not repeated herein. The memory is configured to store one or more computer programs. The processor is coupled with the memory and is configured to execute the one or more computer programs to cause the first electronic device 120 to achieve one or more functions.

It should be understood that the second vehicle 150 and the second electronic device 160 are similar to the first vehicle no and the first electronic device 120 respectively, which are not repeated herein.

The server 140 can communicate with at least one of the first vehicle no, the first electronic device 120, the second vehicle 150, or the second electronic device 160. The server 140 may include, but is not limited to, a personal computer, a server computer, a multi-processor system, a mainframe computer, a distributed computing environment including any of the aforementioned systems or devices, and the like. In some implementations, the server 140 may include one or more processing units, including dedicated processing units such as graphics processing units (GPUs), field-programmable gate arrays (FPGAs), and application specific integrated circuits (ASICs), and general-purpose processing units such as central processing units (CPUs). In addition, one or more virtual machines can also be run on the server 140.

In some implementations, a platform for managing vehicle information may be implemented in the server 140. In some implementations, the server 140 may be a part of the platform for managing vehicle information. For example, the server 140 can be used as a part of an internet of vehicles (IoV) platform. Alternatively or additionally, in some implementations, a platform for vehicle-sharing services can be implemented in the server 140. In some implementations, the server 140 may act as a part of the platform for vehicle-sharing services.

It can be understood that though two vehicles and two electronic devices are illustrated in FIG. 1, yet it is just an example. The information processing environment 100 may involve more vehicles and more electronic devices. The disclosure is not limited thereto.

In the following, operations performed by the server 140 will be described in detail in conjunction with FIG. 2.

Figure 2:
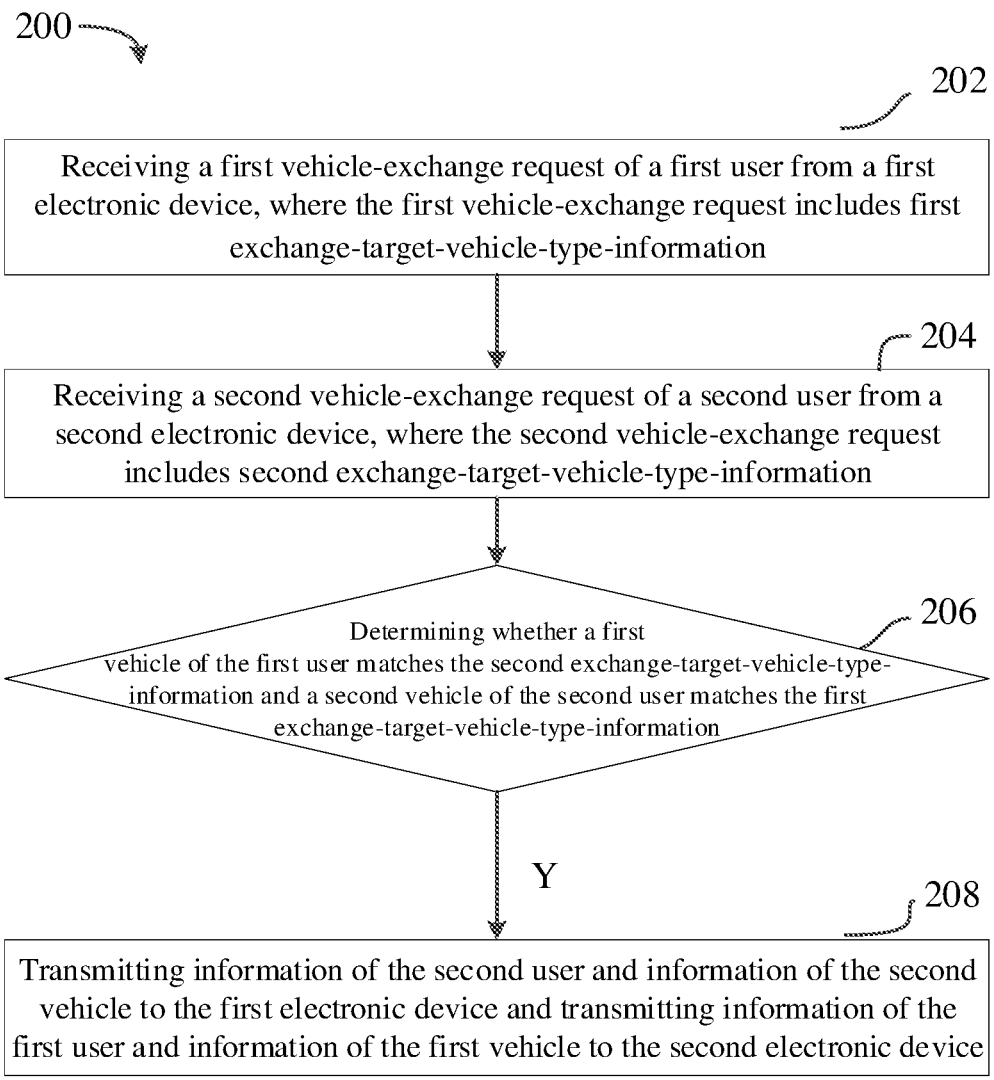
FIG. 2 is a schematic flow chart illustrating a method 200 for information processing according to example implementations of the disclosure.

FIG. 2 is a schematic flow chart illustrating a method 200 for information processing according to implementations of the disclosure. For example, the method 200 may be performed by the server 140 as illustrated in FIG. 1. It should be noted that the method 200 may further include additional blocks not illustrated and/or may omit blocks illustrated, and the disclosure is not limited thereto.

At block 202, a first vehicle-exchange request of a first user 130 is received at the server 140 from the first electronic device 120, where the first vehicle-exchange request includes first exchange-target-vehicle-type-information.

At block 204, a second vehicle-exchange request of a second user 170 is received from a second electronic device 160, where the second vehicle-exchange request includes second exchange-target-vehicle-type-information.

In some implementations, the vehicle-type-information may include a brand of a vehicle. For example, the first exchange-target-vehicle-type-information indicates that the brand of the vehicle is BMW®, and the second exchange-target-vehicle-type-information indicates that the brand of the vehicle is Mercedes-Benz®.

Alternatively or additionally, the vehicle-type-information may include a model of the vehicle. For example, the first exchange-target-vehicle-type-information indicates that the model of the vehicle is BMW X5, and the second exchange-target-vehicle-type-information indicates that the model of the vehicle is Mercedes-Benz S300.

Alternatively or additionally, the vehicle-type-information may include a style of the vehicle. For example, the first exchange-target-vehicle-type-information indicates that the vehicle is a 2018 style of BMW X5, and the second exchange-target-vehicle-type-information indicates that the vehicle is a 2019 style of Mercedes-Benz S300.

Alternatively or additionally, the vehicle-type-information may include license plate information of the vehicle. The license plate information may indicate the attribution of the license plate, for example, the license plate information indicates that the license plate is a Beijing license plate, a Shanghai license plate, or a Shenzhen license plate.

Alternatively or additionally, the vehicle-type-information may further include a category of the vehicle. The category of the vehicle may indicate that the vehicle is a sedan, a sport utility vehicle (SUV), a sports car, a commercial vehicle, a tool vehicle, or the like.

Alternatively or additionally, the vehicle-type-information may further include exhaust emission information. The exhaust emission information may include, for example, exhaust emission classification information such as large amount of exhaust emission, medium amount of exhaust emission, or small amount of exhaust emission, or may include specific amount of exhaust emission, such as 2.0 L, 3.0 L, or the like.

Alternatively or additionally, the vehicle-type-information may further indicate the number of passengers who the vehicle can carry. For example, the vehicle-type-information may indicate that the vehicle is a one-seat vehicle, a two-seats vehicle, a three-seats vehicle, a four-seats vehicle, a five-seats vehicle, a six-seats vehicle, or a seven-seats vehicle.

Alternatively or additionally, the vehicle-type-information may further indicate whether a child safety seat is equipped in the vehicle.

At block 206, determine whether a first vehicle no of the first user 130 matches the second exchange-target-vehicle-type-information and a second vehicle 150 of the second user 170 matches the first exchange-target-vehicle-type-information.

In some implementations, the server 140 may store information of the first vehicle no of the first user 130 and information of the second vehicle 150 of the second user 170, and determine whether the first vehicle no of the first user 130 matches the second exchange-target-vehicle-type-information and the second vehicle 150 of the second user 170 matches the first exchange-target-vehicle-type-information based on the stored information of the first vehicle no of the first user 130 and the information of the second vehicle 150 of the second user 170. For example, the server 140 may previously receive the information of the first vehicle no from the first vehicle no or may previously receive the information of the first vehicle no from the first electronic device 120. Similarly, the server 140 may previously receive the information of the second vehicle 150 from the second vehicle 150 or may previously receive the information of the second vehicle 150 from the second electronic device 160. The information of the vehicle may include, for example, the vehicle-type-information of the vehicle. Examples of the vehicle-type-information are illustrated in the above, which are not repeated herein.

Alternatively or additionally, in some implementations, the first vehicle-exchange request may further include vehicle-type-information of the first vehicle of the first user, and the second vehicle-exchange request may further include vehicle-type-information of the second vehicle of the second user. The server can determine whether the vehicle-type-information of the first vehicle no of the first user 130 matches the second exchange-target-vehicle-type-information and the vehicle-type-information of the second vehicle 150 of the second user 170 matches the first exchange-target-vehicle-type-information.

If it is determined that at block 206, the first vehicle no of the first user 130 matches the second exchange-target-vehicle-type-information and the second vehicle 150 of the second user 170 matches the first exchange-target-vehicle-type-information, information of the second user 170 and the information of the second vehicle 150 are transmitted to the first electronic device 120 and information of the first user 130 and the information of the first vehicle no are transmitted to the second electronic device 160 at block 208.

In some implementations, the server 140 may store the information of the first user 130 and the information of the second user 170. For example, the information of the user includes a photo, a profile, contact information, a credit rating, vehicle-type preference, a license plate number, a traffic violation history, or the like of the user. In some implementations, the server 140 may previously receive the information of the first user 130 from the first electronic device 120. Similarly, the server 140 may previously receive the information of the second user 170 from the second electronic device 160. Alternatively or additionally, in some implementations, the server 140 may previously obtain another portion of information of the user from a third-party platform based on a portion of the information of the user. For example, the server 140 can obtain, from a traffic violation platform, the traffic violation history corresponding to the license plate number of the user based on the license plate number.

In this way, it is possible to achieve matching of vehicle-exchange requirements based on vehicle types, and meet the vehicle-exchange experience of users, thereby improving user experience.

Alternatively or additionally, in some implementations, the method 200 further includes the following. A distance between a position of the first vehicle no of the first user 130 and a position of the second vehicle 150 of the second user 170 is determined. The information of the second user 170 and the information of the second vehicle 150 are transmitted to the first electronic device 120 and the information of the first user 130 and the information of the first vehicle no are transmitted to the second electronic device 160, upon determining that the distance is shorter than a threshold distance. The position of the first vehicle no of the first user 130 and the position of the second vehicle 150 of the second user 170 may be previously received by the server 140 from the first vehicle no and the second vehicle 150, or from the first electronic device 120 and the second electronic device 160. The threshold distance may be, for example, 80 kilometers, 50 kilometers, 30 kilometers, 10 kilometers, 1 kilometer, 500 meters, 100 meters, or the like.

In this way, vehicle-exchange requirements based on vehicle types within a threshold distance can be realized, and thus the short-distance vehicle-exchange experience can be met, thereby improving user experience.

Alternatively or additionally, in some implementations, the method 200 further includes the following. Time of vehicle exchange is determined. A position of the vehicle exchange is determined. The position of the vehicle exchange and the time of the vehicle exchange are transmitted to the first electronic device 120 and the second electronic device 160. The following may describe this in detail in conjunction with FIG. 3.

Alternatively or additionally, in some implementations, the method 200 further includes the following. A first vehicle pick-up request is received from the first electronic device 120, the first vehicle pick-up request is transmitted to the second electronic device 160, and a virtual key associated with the second vehicle 150 is transmitted to the first electronic device 120 in response to a first vehicle pick-up confirmation message being received from the second electronic device 160.

Alternatively or additionally, in some implementations, the method 200 further includes the following. A second vehicle pick-up request is received from the second electronic device 160, the second vehicle pick-up request is transmitted to the first electronic device 120, and a virtual key associated with the first vehicle no is transmitted to the second electronic device 160 in response to a second vehicle pick-up confirmation message being received from the first electronic device 120.

In some implementations, the server 140 may store the virtual key associated with the first vehicle no and the virtual key associated with the second vehicle 150. For example, the server 140 may previously receive the virtual key associated with the first vehicle no from the first electronic device 120. Similarly, the server 140 may previously receive the virtual key associated with the second vehicle 150 from the second electronic device 160. The virtual key, for example, may be used for unlocking and/or starting the vehicle through a Bluetooth protocol, an NFC protocol, a cellular communication protocol, or the like. The virtual key, for example, may include control authority for the vehicle. For example, the control authority includes control authority for a multimedia, trunk, a glove box, a vehicle speed, geographical reach, or the like. Alternatively, the control authority includes control authority for the available time of the vehicle.

In some implementations, the first vehicle pick-up confirmation message may include the virtual key associated with the second vehicle iso. Similarly, in some implementations, the second vehicle pick-up confirmation message may include the virtual key associated with the first vehicle no. In this case, the server 140 may store the received virtual key associated with the first vehicle no and the received virtual key associated with the second vehicle 150 for subsequent verification.

As a result, it is possible to realize vehicle exchange based on the virtual keys, which avoids the use of physical keys for vehicle exchange, thereby improving convenience and safety.

Alternatively or additionally, in some implementations, the method 200 further includes the following. A first vehicle-return request is received from the first electronic device 120, the first vehicle-return request is transmitted to the second electronic device 160, the virtual key associated with the second vehicle 150 is invalidated in response to first vehicle-return confirmation being received from the second electronic device 160, and the first vehicle-return confirmation is transmitted to the first electronic device 120.

Alternatively or additionally, in some implementations, the method 200 further includes the following. A second vehicle-return request is received from the second electronic device 160, the second vehicle-return request is transmitted to the first electronic device 120, the virtual key associated with the first vehicle no is invalidated in response to second vehicle-return confirmation being received from the first electronic device 120, and the second vehicle-return confirmation is transmitted to the second electronic device 160.

In some implementations, invalidating the virtual key includes, for example, deleting the stored virtual key, so that a next verification performed on the virtual key fails as the corresponding stored virtual key cannot be found. In some implementations, invalidating the virtual key includes, for example, setting an invalidation tag, so that a next verification performed on the virtual key fails when the invalidation tag is read.

As a result, it is possible to return the vehicle after the vehicle exchange based on the virtual key, which avoids using the physical key to return the vehicle, thereby improving convenience and safety.

Alternatively or additionally, in some implementations, the method 200 further includes the following. A vehicle-takeback request is received from the first electronic device 120. The vehicle-takeback request is transmitted to the second electronic device 160. If vehicle-takeback confirmation is received from the second electronic device 160, the virtual key associated with the first vehicle no is invalidated. The vehicle-takeback confirmation is transmitted to the first electronic device 120.

In this way, it is possible to realize vehicle takeback based on the virtual key, which avoids using the physical key to return the vehicle, thereby improving convenience and safety.

Alternatively or additionally, in some implementations, the method 200 further includes the following. An unlock instruction for the second vehicle 150 is received from the first electronic device 120, where the unlock instruction includes the virtual key associated with the second vehicle 150 and a face image. Determine whether the face image matches a pre-stored face image of the first user and the virtual key associated with the second vehicle 150 is valid. If the face image is determined to match the pre-stored face image of the first user and the virtual key associated with the second vehicle 150 is valid, the unlock instruction is transmitted to the second vehicle 150. The pre-stored face image of the first user may be previously received from the first electronic device 120 and stored.

As a result, it is possible to realize the unlocking of the vehicle based on the virtual key, which avoids using the physical key to unlock the vehicle, thereby improving convenience and safety. In addition, since unlocking is conducted in conjunction with face image recognition, the users using the vehicle can be limited, which further improves the safety of vehicle exchange.

Figure 3:
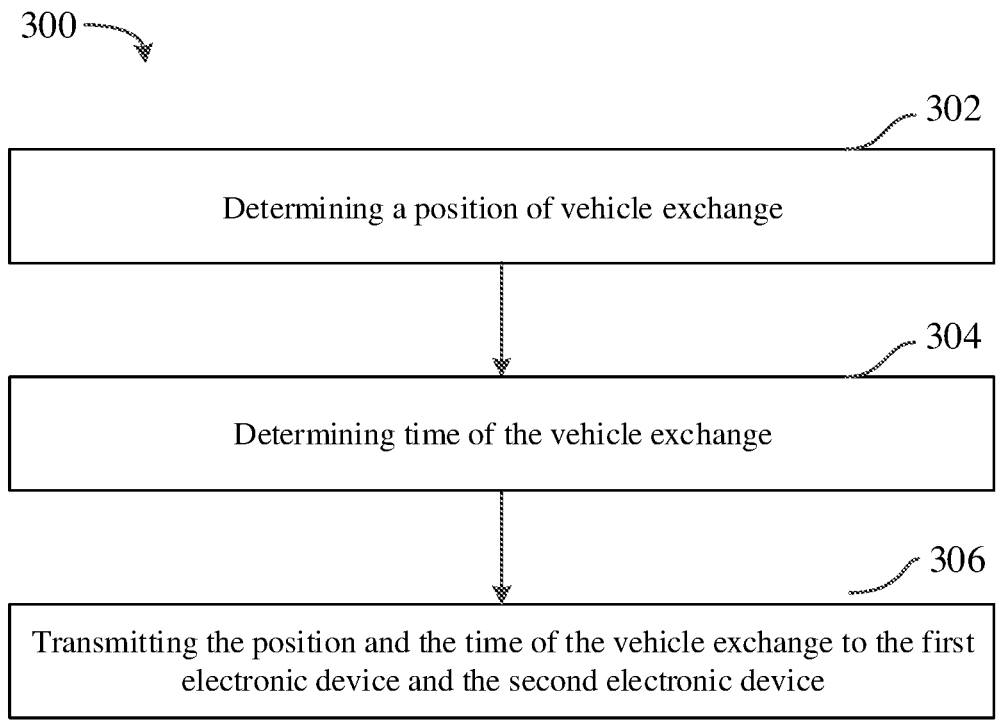
FIG. 3 is a schematic flow chart illustrating a method 300 for information processing according to example implementations of the disclosure.

FIG. 3 is a schematic flow chart illustrating a method 300 for information processing according to implementations of the disclosure. For example, the method 300 may be performed by the server 140 as illustrated in FIG. 1. It should be noted that the method 300 may further include additional blocks not illustrated and/or may omit blocks illustrated, and the disclosure is not limited thereto.

At block 302, the position of the vehicle exchange is determined.

In some implementations, the position of the vehicle exchange is determined as follows. The position of the vehicle exchange is determined according to a position of the first vehicle no and a position of the second vehicle 150. In some implementations, the server 140 may store the position of the first vehicle no and the position of the second vehicle 150. For example, the server 140 may previously receive the position of the first vehicle no from the first vehicle no or the first electronic device 120. Similarly, the server 140 may previously receive the position of the second vehicle iso, which are not repeated herein. In some implementations, the position of the vehicle exchange is determined according to the position of the first vehicle no and the position of the second vehicle 150 as follows. The position of the first vehicle no is received from the first vehicle no or the first electronic device 120, the position of the second vehicle 150 is received from the second vehicle 150 or the second electronic device 160, and the position of the vehicle exchange is determined based on the received position of the first vehicle no and the position of the second vehicle 150.

In some implementations, the position of the vehicle exchange may be determined based on a midpoint of a connecting line between the position of the first vehicle no and the position of the second vehicle 150. For example, a parking lot closest to the midpoint of the connecting line between the position of the first vehicle no and the position of the second vehicle 150 may be determined as the position of the vehicle exchange. In this way, relative distances from the exchange position to both users exchanging the vehicles are equalized, such that the needs of both users can be balanced.

Alternatively or additionally, in some implementations, the position of the vehicle exchange may be determined as follows. A distance between the position of the first vehicle no and the position of the second vehicle 150 is determined, and if the distance is determined to be shorter than a threshold distance, at least one of the position of the first vehicle no or the position of the second vehicle 150 is determined as the position of the vehicle exchange. The threshold distance may include, for example, 50 meters, 30 meters, 10 meters, or the like. In this way, on condition that the two vehicles are relatively close to each other, for example, the first vehicle and the second vehicle are in a same parking lot, the position of one of the two vehicles or the position of the two vehicles can be determined as the position of the vehicle exchange, and thus there is no need to move the vehicle.

Alternatively or additionally, in some implementations, the method 300 further includes the following. If it is determined that the distance is shorter than the threshold distance, parking space information of the first vehicle no and parking space information of the second vehicle 150 are acquired, and then transmitted to the first electronic device 120 and the second electronic device 160. The parking space information may include a parking space number. The parking space information may be received by the server 140 from the first vehicle no and/or the second vehicle 150 in advance. For example, the first vehicle no and/or the second vehicle 150 capture the parking space information through their in-vehicle cameras, and send the parking space information to the server 140. The parking space information may also be received by the server 140 from the first electronic device 120 and/or the second electronic device 160 in advance. For example, the parking space information of the first vehicle no is captured through a camera of the first electronic device 120 and/or the parking space information of the second vehicle 150 is captured through a camera of the second electronic device 160, and then the parking space information of the first vehicle no and/or the parking space information of the second vehicle 150 are transmitted to the server 140. In this way, on condition that the two vehicles are relatively close to each other, the parking space information of the vehicle can be additionally provided, so that the user can find the vehicle more conveniently.

Alternatively or additionally, in some implementations, the method 300 further includes the following. Based on the acquired parking space information of the first vehicle no and the acquired parking space information of the second vehicle iso, navigation information between the first vehicle no and the second vehicle 150 is acquired, and the navigation information is transmitted to the first electronic device 120 and the second electronic device 160. For example, the server 140 may send a navigation request to a third-party map platform, where the navigation request includes the parking space information of the first vehicle no and the parking space information of the second vehicle iso, and obtain the navigation information between the first vehicle no and the second vehicle 150 from the third-party map platform. For example, a map platform can be implemented in the server 140. The server 140 can generate the navigation information between the first vehicle no and the second vehicle 150 based on the parking space information of the first vehicle no and the parking space information of the second vehicle 150. In this way, when the two vehicles are relatively close to each other, the parking space information of the vehicle can be additionally provided, so that the vehicle can be easier to be found.

In addition to determining the position of the vehicle exchange according to the position of the vehicle, in some implementations, the position of the vehicle exchange can also be determined as follows. The position of the vehicle exchange can be determined according to a historical travel trajectory of the first vehicle no and a historical travel trajectory of the second vehicle 150. In some implementations, the server 140 may store the historical travel trajectory of the first vehicle no and the historical travel trajectory of the second vehicle 150. For example, the server 140 may previously receive the historical travel trajectory of the first vehicle no from the first vehicle no or the first electronic device 120. A manner in which the historical travel trajectory of the second vehicle 150 is received is similar to that in which the historical travel trajectory of the first vehicle no is received. The disclosure is not limited thereto. In some implementations, the position of the vehicle exchange can be determined according to the historical travel trajectory of the first vehicle no and the historical travel trajectory of the second vehicle 150 as follows. The historical travel trajectory of the first vehicle no is received from the first vehicle no or the first electronic device 120, and the historical travel trajectory of the second vehicle 150 is received from the second vehicle 150 or the second electronic device 160. The position of the vehicle exchange is determined according to the received historical travel trajectory of the first vehicle no and the historical travel trajectory of the second vehicle iso. The following will describe the determination of the position of the vehicle exchange in detail in conjunction with FIG. 4.

At block 304, the time of the vehicle exchange is determined.

In some implementations, the time of the vehicle exchange is determined as follows. Available time of the first user 130 is received from the first electronic device 120. Available time of the second user 170 is received from the second electronic device 160. The time of the vehicle exchange is determined according to the available time of the first user 130 and the available time of the second user 170. For example, the available time of the first user 130 is from 9 am to 7 pm on Saturday, the available time of the second user 170 is from 3 pm on Saturday to 7 pm on Sunday, and thus any time between 3 pm and 7 pm on Saturday can be determined as the time of the vehicle exchange.

At block 306, the position of the vehicle exchange and the time of the vehicle exchange are transmitted to the first electronic device 120 and the second electronic device 160.

Thus, it is possible to determine the position and time of the vehicle exchange, such that vehicle exchange can be conducted based on the determined position and time, thereby improving the user experience.

Figure 4:
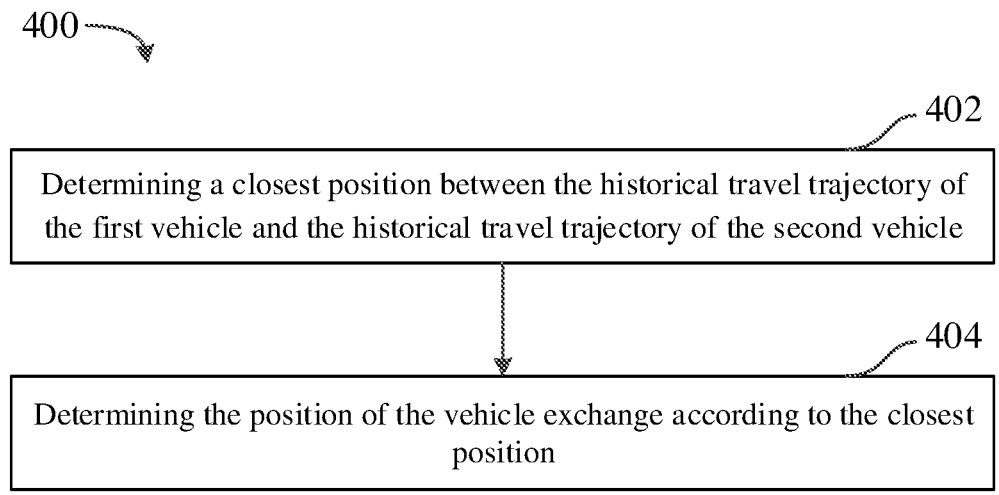
FIG. 4 is a schematic flow chart illustrating a method 400 for information processing according to example implementations of the disclosure.

FIG. 4 is a schematic flow chart illustrating a method 400 for information processing according to implementations of the disclosure. For example, the method 400 may be performed by the server 140 as illustrated in FIG. 1. It should be noted that the method 400 may further include additional blocks not illustrated and/or may omit blocks illustrated, and the disclosure is not limited thereto.

At block 402, a closest position between the historical travel trajectory of the first vehicle no and the historical travel trajectory of the second vehicle 150 is determined.

In some implementations, the historical travel trajectory of the first vehicle no and the historical travel trajectory of the second vehicle 150 do not intersect, and thus the closest position may be two closest points (for example, point A and point B in FIG. 5a) between the historical travel trajectory of the first vehicle no and the historical travel trajectory of the second vehicle 150.

Figure 5:
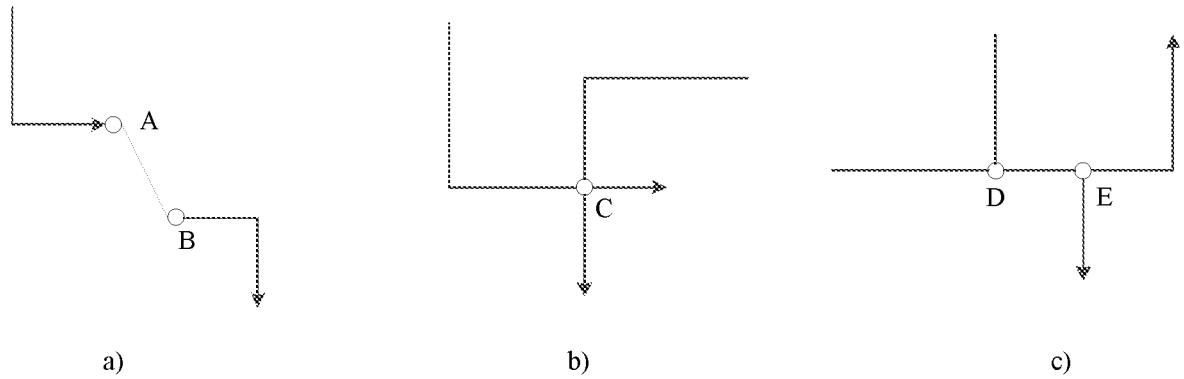
FIG. 5 is a schematic diagram illustrating historical travel trajectories of vehicles according to example implementations of the disclosure.

In some implementations, the historical travel trajectory of the first vehicle no and the historical travel trajectory of the second vehicle 150 intersect, and thus the closest position may be an intersection (for example, point C in FIG. 5b) between the historical travel trajectory of the first vehicle no and the historical travel trajectory of the second vehicle 150. It should be understood that the intersection illustrated in FIG. 5b is merely an example, and there may be two or more intersections between the historical travel trajectory of the first vehicle no and the historical travel trajectory of the second vehicle iso.

In some implementations, the historical travel trajectory of the first vehicle no and the historical travel trajectory of the second vehicle 150 are partially overlapped, and thus the closest position may be an overlapped segment (a segment from point D to point E in FIG. 5c) between the historical travel trajectory of the first vehicle no and the historical travel trajectory of the second vehicle 150. It should be understood that the overlapped segment illustrated in FIG. 5c is exemplary and there may also be two or more overlapped segments between the historical travel trajectory of the first vehicle no and the historical travel trajectory of the second vehicle 150. It can also be understood that the straight-line-shaped overlapped segment illustrated in FIG. 5c is merely an example, and the overlapped segment may also be in other shapes, such as a broken line, a curve, or a combination of one or more of the shapes.

At block 404, the position of the vehicle exchange is determined according to the closest position.

In some implementations, the position of the vehicle exchange is determined as follows. A parking lot closest to the closest position is determined, and the parking lot is determined as the position of the vehicle exchange.

As mentioned above, in some implementations, if the historical travel trajectory of the first vehicle no and the historical travel trajectory of the second vehicle 150 do not intersect, the closest position may be two points (such as, point A and point B in FIG. 5a) in the historical travel trajectory of the first vehicle no and the historical travel trajectory of the second vehicle 150, and thus a parking lot closest to a connecting line between the two points can be determined as the position of the vehicle exchange.

Alternatively, as mentioned above, the closest position is the intersection (such as, point C in FIG. 5b) of the historical travel trajectory of the first vehicle no and the historical travel trajectory of the second vehicle iso, and thus a parking lot closest to the intersection is determined as the position of the vehicle exchange.

Alternatively, as mentioned above, the closest position is the overlapped segment (for example, the segment from point D to point E in FIG. 5c) between the historical travel trajectory of the first vehicle no and the historical travel trajectory of the second vehicle iso, and thus a parking lot closest to the overlapped segment is determined as the position of the vehicle exchange.

As a result, the position of the vehicle exchange is determined based on the historical travel trajectories of both vehicles, so that the position of the vehicle exchange is close to the actual travel route of the both vehicles, and the user does not need to travel a long distance to the position of the vehicle exchange additionally, thereby improving the user experience. In addition, by selecting the nearest parking lot as the position of the vehicle exchange, more parking spaces can be provided to facilitate the vehicle exchange.

In some implementations, the method 400 further includes the following. When the historical travel trajectory of the first vehicle is closest to the historical travel trajectory of the second vehicle, historical travel time of the first vehicle no and historical travel time of the second vehicle 150 are determined. The time of the vehicle exchange is determined according to the historical travel time of the first vehicle no and the historical travel time of the second vehicle 150. In some implementations, the time of the vehicle exchange is determined as follows. A time interval between the historical travel time of the first vehicle no and the historical travel time of the second vehicle 150 is determined. In response to determining that the time interval is shorter than a threshold time interval, any time in the time interval is determined as the time of the vehicle exchange. For example, when the historical travel trajectory of the first vehicle is closest to the historical travel trajectory of the second vehicle, the historical travel time of the first vehicle no is 6 pm every Wednesday, and the historical travel time of the second vehicle 150 is 6:20 pm every Wednesday, that is, the time interval between the historical travel time of the first vehicle no and the historical travel time of the second vehicle 150 is shorter than 30 minutes, and thus any time between 6 pm and 6:20 pm on Wednesday, such as a time midpoint (e.g., 6:10) of the time interval, can be determined as the time of the vehicle exchange.

As a result, it is possible to determine the time of the vehicle exchange based on the historical travel time of the vehicles when the historical travel trajectories of the vehicles are closest to each other, so that the time of the vehicle exchange is close to the historical travel time of the vehicles, which saves the time of the user and improves the user experience.

Figure 6:
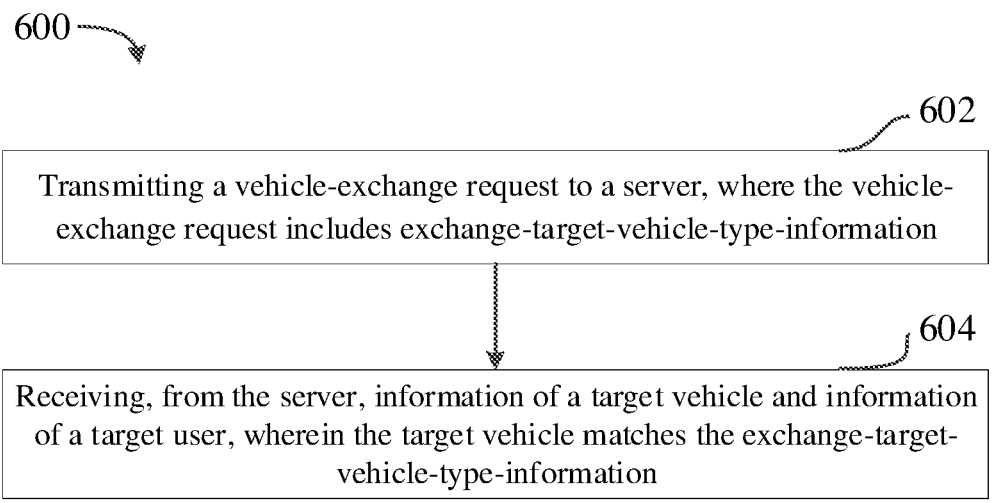
FIG. 6 is a schematic flow chart illustrating a method 600 for information processing according to example implementations of the disclosure.

FIG. 6 is a schematic flow chart illustrating a method 600 for information processing according to implementations of the disclosure. For example, the method 600 may be performed by the first electronic device 120 or the second electronic device 160 as illustrated in FIG. 1. It should be noted that the method 600 may further include additional blocks not illustrated and/or may omit blocks illustrated, and the disclosure is not limited thereto.

At block 602, at an electronic device 120, a vehicle-exchange request is transmitted to a server 140, where the vehicle-exchange request includes exchange-target-vehicle-type-information.

At block 604, information of a target vehicle 150 and information of a target user 170 are received from the server 140, where the target vehicle matches the exchange-target-vehicle-type-information.

As a result, it is possible to achieve matching of vehicle-exchange requirements based on vehicle types, and meet the vehicle-exchange experience of users, thereby improving user experience.

Alternatively or additionally, in some implementations, the method 600 further includes the following. Time and position of vehicle exchange are received from the server 140.

Alternatively or additionally, in some implementations, the method 600 further includes the following. Available time of a user 130 is obtained, and the available time of the user 130 is transmitted to the server 140, where the time of the vehicle exchange received from the server 140 is determined by the server 140 according to the available time of the user 130. In some implementations, the available time of the user 130 is obtained as follows. That obtaining the available time of the user 130 can include that obtaining available time entered by the user 130. In some implementations, the available time of the user 130 is obtained as follows. The available time of the user 130 is obtained according to schedule of the user. In this way, the time of vehicle exchange can be automatically determined based on the available time of the user, which facilitates the user to exchange vehicles.

Alternatively or additionally, in some implementations, the method 600 further includes the following. If a vehicle pick-up request of the user 130 is received, the vehicle pick-up request is transmitted to the server 140. A virtual key associated with the target vehicle 150 is received form the server 140. The vehicle pick-up request may be triggered in response to a clicking operation on a vehicle pick-up button on an interface performed by the user, or in response to a voice vehicle pick-up instruction entered by the user. In this way, it is possible to realize the vehicle exchange based on the virtual key, and there is no need to exchange the vehicles through a physical key, which improves convenience and safety.

Alternatively or additionally, in some implementations, the method 600 further includes the following. If a vehicle-return request of the user 130 is received, the vehicle-return request is transmitted to the server 140. A vehicle-return confirmation message is received from the server 140. The vehicle-return request may be triggered in response to a clicking operation on a vehicle-return button on the interface performed by the user, or in response to a voice vehicle-return instruction entered by the user.

Alternatively or additionally, in some implementations, the method 600 further includes the following. If an unlock request for the target vehicle 150 of the user 130 is received, a face image of the user 130 is captured. An unlock instruction for the target vehicle 150 is transmitted to the server 140, where the unlock instruction includes the face image of the user 130 and the virtual key associated with the target vehicle iso. The unlock request may be triggered in response to a clicking operation on an unlock button on the interface performed by the user, or in response to a voice unlock instruction entered by the user. As a result, it is possible to realize the unlocking of the vehicle based on the virtual key, which avoids using the physical key to unlock the vehicle, thereby improving convenience and safety. In addition, since the unlocking is conducted in conjunction with the face image recognition, the user using the vehicle can be limited, which further improves the safety of the vehicle exchange.

Figure 7:
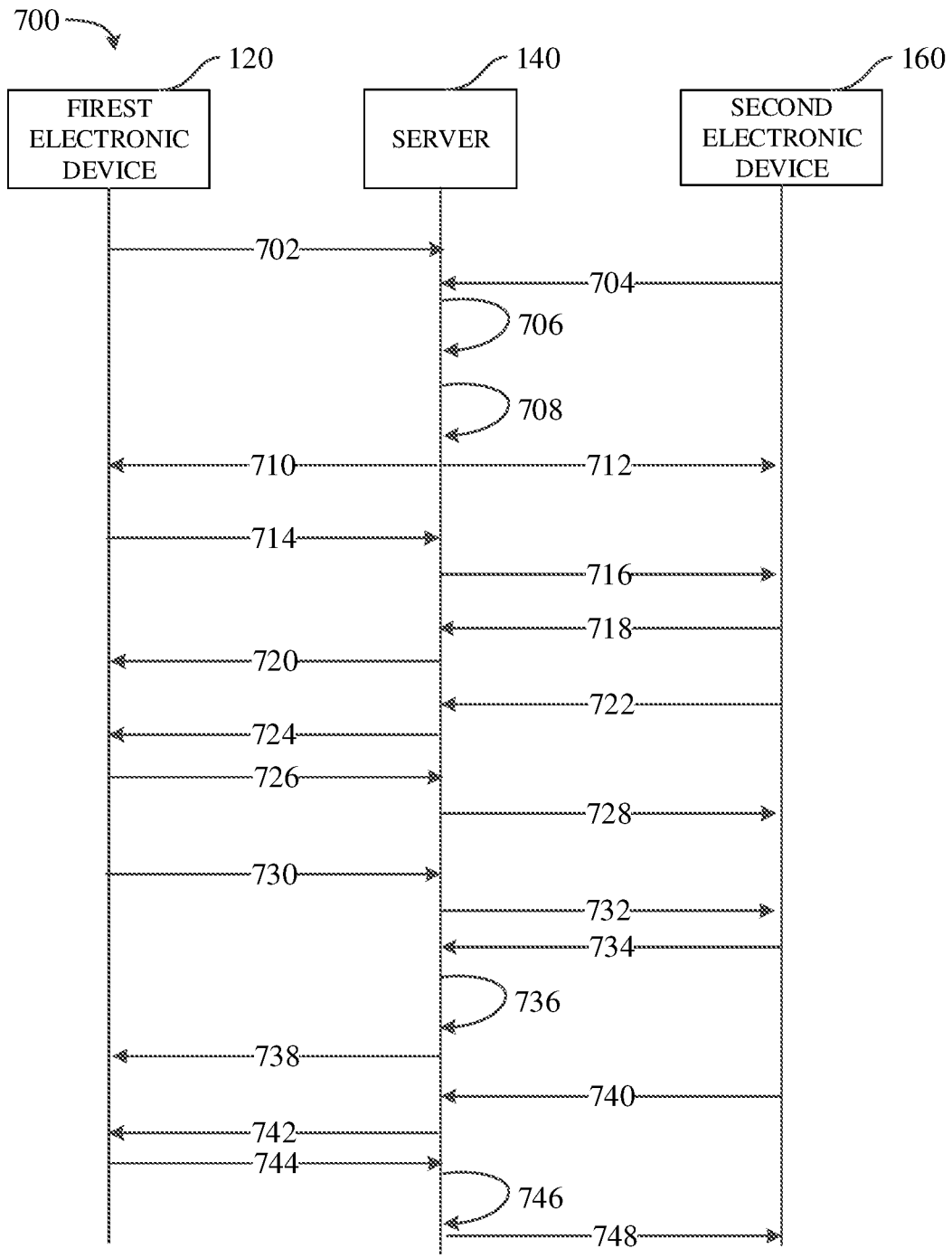
FIG. 7 is a schematic flow chart illustrating a method 700 for information processing according to example implementations of the disclosure.

FIG. 7 is a schematic flow chart illustrating a method 700 for information processing according to implementations of the disclosure. It should be noted that the method 700 may further include additional blocks not illustrated and/or may omit blocks illustrated, and the disclosure is not limited thereto.

At block 702, a first electronic device 120 transmits a first vehicle-exchange request of a first user 130 to a server 140, where the first vehicle-exchange request includes first exchange-target-vehicle-type-information.

At block 704, a second electronic device 160 transmits a second vehicle-exchange request of a second user 170 to the server 140, where the second vehicle-exchange request includes second exchange-target-vehicle-type-information.

At block 706, the server 140 determines whether a first vehicle no of the first user 130 matches the second exchange-target-vehicle-type-information and a second vehicle 150 of the second user 170 matches the first exchange-target-vehicle-type-information.

At block 708, the server 140 determines a position and time of vehicle exchange.

At block 710, the server 140 transmits the position and the time of the vehicle exchange to the first electronic device 120.

At block 712, the server 140 transmits the position and the time of the vehicle exchange to the second electronic device 160.

At block 714, the first electronic device 120 transmits a first vehicle pick-up request to the server 140.

At block 716, the server 140 transmits the first vehicle pick-up request to the second electronic device 160.

At block 718, the second electronic device 160 transmits a first vehicle pick-up confirmation message to the server 140.

At block 720, the server 140 transmits a virtual key associated with the second vehicle 150 to the first electronic device 120.

At block 722, the second electronic device 160 transmits a second vehicle pick-up request to the server 140.

At block 724, the server 140 transmits the second vehicle pick-up request to the first electronic device 120.

At block 726, the first electronic device 120 transmits a second vehicle pick-up confirmation message to the server 140.

At block 728, the server 140 transmits a virtual key associated with the first vehicle 110 to the second electronic device 160.

At block 730, the first electronic device 120 transmits a first vehicle-return request to the server 140.

At block 732, the server 140 transmits the first vehicle-return request to the second electronic device 160.

At block 734, the second electronic device 160 transmits first vehicle-return confirmation to the server 140.

At block 736, the server 140 invalidates the virtual key associated with the second vehicle 150.

At block 738, the server 140 transmits the first vehicle-return confirmation to the first electronic device 120.

At block 740, the second electronic device 160 transmits a second vehicle-return request to the server 140.

At block 742, the server 140 transmits the second vehicle-return request to the first electronic device 120.

At block 744, the first electronic device 120 transmits second vehicle-return confirmation to the server 140.

At block 746, the server 140 invalidates the virtual key associated with the first vehicle 110.

At block 748, the server 140 transmits the second vehicle-return confirmation to the second electronic device 160.

Figure 8:
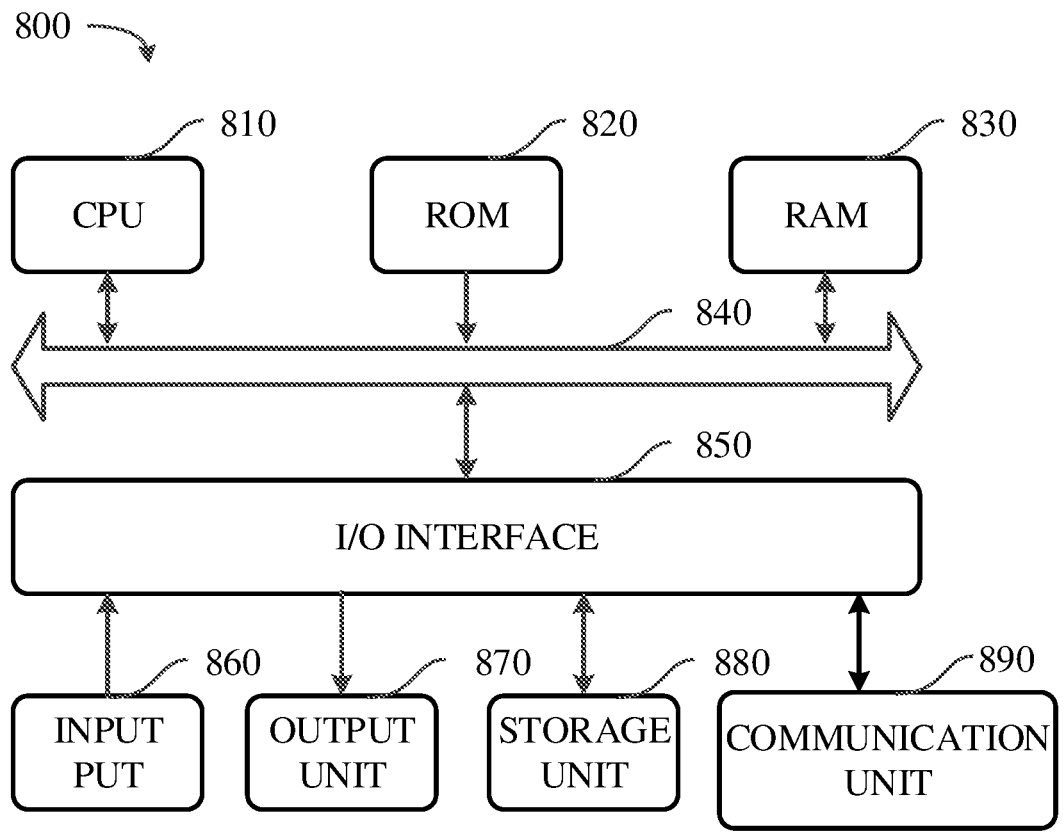
FIG. 8 is a schematic block diagram illustrating an exemplary device 800 which can be used to implement the disclosure.

FIG. 8 is a schematic block diagram illustrating an exemplary device 800 which can be used to implement the disclosure. For example, the electronic devices 120 and 160 and the server 140 illustrated in FIG. 1 may be implemented by the device 800. As illustrated in FIG. 8, the device 800 includes a central processing unit (CPU) 810, which can perform various appropriate actions and processing according to computer program instructions which are stored in a read-only memory (ROM) 820 or loaded from a storage unit 880 to a random access memory (RAM) 830. In the RAM 830, various programs and data required for the operation of the device 800 can also be stored. The CPU 810, the ROM 820, and the RAM 830 are connected with each other through a bus 840. An input/output (I/O) interface 850 is also connected with the bus 840.

Multiple components in the device 800 are connected to the I/O interface 850. The multiple components include: an input unit 860, such as a keyboard, a mouse, etc.; an output unit 870, such as various types of displays, speakers, etc.; a storage unit 880, such as a magnetic disk, an optical disk, etc.; and a communication unit 890, such as a network card, a modem, a wireless communication transceiver, etc. The communication unit 890 allows the device 800 to exchange information/data with other devices through a computer network such as the Internet and/or various telecommunication networks.

The various procedures and processing described above, such as the methods 200-700, may be executed by the processing unit 810. For example, in some implementations, the methods 200-700 may be implemented as computer software programs, which are tangibly contained in a machine-readable medium, such as the storage unit 880. In some implementations, part or all of the computer programs may be loaded and/or installed on the device 800 via the ROM 820 and/or the communication unit 890. When the computer programs are loaded into the RAM 830 and executed by the CPU 810, one or more actions of the methods 200-700 described above may be executed.

The disclosure may be a method, device, system, and/or computer program product. The computer program product may include a non-transitory computer-readable storage medium storing computer-readable program instructions for executing various aspects of the disclosure.

The non-transitory computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

The computer-readable program instructions for carrying out operations of the disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an internet service provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various implementations of the disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:
   receiving, at a server, a first vehicle-exchange request of a first user from a first electronic device, wherein the first vehicle-exchange request comprises first exchange-target-vehicle-type-information;
   receiving, at the server, a second vehicle-exchange request of a second user from a second electronic device, wherein the second vehicle-exchange request comprises second exchange-target-vehicle-type-information;

determining, at the server, whether a first vehicle of the first user matches the second exchange-target-vehicle-type-information and a second vehicle of the second user matches the first exchange-target-vehicle-type-information;

transmitting, from the server, information of the second user and information of the second vehicle to the first electronic device, and transmitting, from the server, information of the first user and information of the first vehicle to the second electronic device, in response to determining that the first vehicle of the first user matches the second exchange-target-vehicle-type-information and the second vehicle of the second user matches the first exchange-target-vehicle-type-information;

determining, at the server, a position of vehicle exchange;

determining, at the server, time of the vehicle exchange;

transmitting, from the server, the position of the vehicle exchange and the time of the vehicle exchange to the first electronic device and the second electronic device;

receiving, at the server, a first vehicle pick-up request from the first electronic device, transmitting, from the server, the first vehicle pick-up request to the second electronic device, and transmitting, from the server, a virtual key associated with the second vehicle to the first electronic device in response to a first vehicle pick-up confirmation message being received from the second electronic device; and receiving, at the server, a second vehicle pick-up request from the second electronic device, transmitting, from the server, the second vehicle pick-up request to the first electronic device, and transmitting, at the server, a virtual key associated with the first vehicle to the second electronic device in response to a second vehicle pick-up confirmation message being received from the first electronic device; wherein the virtual key associated with the first vehicle comprises control authority for the first vehicle, and is used for unlocking and/or starting the first vehicle through a wireless communication protocol; and the virtual key associated with the second vehicle comprises control authority for the second vehicle, and is used for unlocking and/or starting the second vehicle through the wireless communication protocol.

2. The method of claim 1, further comprising:
determining, at the server, a distance between a position of the first vehicle and a position of the second vehicle; and transmitting, from the server, the information of the second user and the information of the second vehicle to the first electronic device and transmitting, by the server, the information of the first user and the information of the first vehicle to the second electronic device, in response to determining that the distance is shorter than a threshold distance.

3. The method of claim 1, wherein determining the position of the vehicle exchange comprises:
determining, at the server, the position of the vehicle exchange according to a historical travel trajectory of the first vehicle and a historical travel trajectory of the second vehicle.

4. The method of claim 3, wherein determining the position of the vehicle exchange further comprises:

determining, at the server, a closest position between the historical travel trajectory of the first vehicle and the historical travel trajectory of the second vehicle; and determining, at the server, the position of the vehicle exchange according to the closest position.

5. The method of claim 4, wherein determining the time of the vehicle exchange comprises:
determining, at the server, historical travel time of the first vehicle and historical travel time of the second vehicle when the historical travel trajectory of the first vehicle is closest to the historical travel trajectory of the second vehicle;

determining, at the server, a time interval between the historical travel time of the first vehicle and the historical travel time of the second vehicle; and determining, at the server, a time in the time interval as the time of the vehicle exchange, in response to determining that the time interval is shorter than a threshold time interval.

6. The method of claim 1, wherein determining the position of the vehicle exchange comprises:
determining, at the server, the position of the vehicle exchange according to a position of the first vehicle and a position of the second vehicle.

7. The method of claim 1, wherein determining the time of the vehicle exchange comprises:
receiving, at the server, available time of the first user from the first electronic device;

receiving, at the server, available time of the second user from the second electronic device; and determining, at the server, the time of the vehicle exchange according to the available time of the first user and the available time of the second user.

8. The method of claim 1, further comprising:
receiving, at the server, a first vehicle-return request from the first electronic device, transmitting, from the server, the first vehicle-return request to the second electronic device, invalidating, at the server, the virtual key associated with the second vehicle in response to first vehicle-return confirmation being received from the second electronic device, and transmitting, from the server, the first vehicle-return confirmation to the first electronic device; and receiving, at the server, a second vehicle-return request from the second electronic device, transmitting, from the server, the second vehicle-return request to the first electronic device, invalidating, at the server, the virtual key associated with the first vehicle in response to second vehicle-return confirmation being received from the first electronic device, and transmitting, from the server, the second vehicle-return confirmation to the second electronic device.

9. The method of claim 8, further comprising:
receiving, at the server, a vehicle-takeback request from the first electronic device;

transmitting, from the server, the vehicle-takeback request to the second electronic device;

invalidating, at the server, the virtual key associated with the first vehicle in response to vehicle-takeback confirmation being received from the second electronic device; and transmitting, from the server, the vehicle-takeback confirmation to the first electronic device.

10. The method of claim 1, further comprising:
receiving, at the server, an unlock instruction for the second vehicle from the first electronic device, the unlock instruction comprising the virtual key associated with the second vehicle and a face image;
determining, at the server, whether the face image matches a pre-stored face image of the first user and the virtual key associated with the second vehicle is valid; and
transmitting, from the server, the unlock instruction to the second vehicle in response to determining that the face image matches the pre-stored face image of the first user and the virtual key associated with the second vehicle is valid.

11. An electronic device, comprising:
at least one processor; and
at least one non-transitory memory coupled with the at least one processor and storing instructions configured to be executed by the at least one processor, wherein when executed by the at least one processor, the instructions cause the electronic device to:
receive a first vehicle-exchange request of a first user from a first electronic device, wherein the first vehicle-exchange request comprises first exchange-target-vehicle-type-information;
receive a second vehicle-exchange request of a second user from a second electronic device, wherein the second vehicle-exchange request comprises second exchange-target-vehicle-type-information;
determine whether a first vehicle of the first user matches the second exchange-target-vehicle-type-information and a second vehicle of the second user matches the first exchange-target-vehicle-type-information;
transmit information of the second user and information of the second vehicle to the first electronic device, and transmitting information of the first user and information of the first vehicle to the second electronic device, in response to determining that the first vehicle of the first user matches the second exchange-target-vehicle-type-information and the second vehicle of the second user matches the first exchange-target-vehicle-type-information;
determine a position of vehicle exchange;
determine time of the vehicle exchange;
transmit the position of the vehicle exchange and the time of the vehicle exchange to the first electronic device and the second electronic device;
receive a first vehicle pick-up request from the first electronic device, transmit the first vehicle pick-up request to the second electronic device, and transmit a virtual key associated with the second vehicle to the first electronic device in response to a first vehicle pick-up confirmation message being received from the second electronic device; and
receive a second vehicle pick-up request from the second electronic device, transmit the second vehicle pick-up request to the first electronic device, and transmit a virtual key associated with the first vehicle to the second electronic device in response to a second vehicle pick-up confirmation message being received from the first electronic device; wherein
the virtual key associated with the first vehicle comprises control authority for the first vehicle, and is used for unlocking and/or starting the first vehicle through a wireless communication protocol; and
the virtual key associated with the second vehicle comprises control authority for the second vehicle, and is used for unlocking and/or starting the second vehicle through the wireless communication protocol.

12. The electronic device of claim 11, wherein the instructions cause the electronic device further to:
determine a distance between a position of the first vehicle and a position of the second vehicle; and
transmit the information of the second user and the information of the second vehicle to the first electronic device, and transmit the information of the first user and the information of the first vehicle to the second electronic device, in response to determining that the distance is shorter than a threshold distance.

13. The electronic device of claim 11, wherein determining the position of the vehicle exchange comprises:
determining the position of the vehicle exchange according to a historical travel trajectory of the first vehicle and a historical travel trajectory of the second vehicle.

14. The electronic device of claim 13, wherein determining the position of the vehicle exchange further comprises:
determining a closest position between the historical travel trajectory of the first vehicle and the historical travel trajectory of the second vehicle; and
determining the position of the vehicle exchange according to the closest position.

15. The electronic device of claim 14, wherein determining the time of the vehicle exchange comprises:
determining historical travel time of the first vehicle and historical travel time of the second vehicle when the historical travel trajectory of the first vehicle is closest to the historical travel trajectory of the second vehicle;
determining a time interval between the historical travel time of the first vehicle and the historical travel time of the second vehicle; and
determining a time in the time interval as the time of the vehicle exchange, in response to determining that the time interval is shorter than a threshold time interval.

16. The electronic device of claim 11, wherein determining the position of the vehicle exchange comprises:
determining the position of the vehicle exchange according to a position of the first vehicle and a position of the second vehicle.

17. The electronic device of claim 11, wherein determining the time of the vehicle exchange comprises:
receiving available time of the first user from the first electronic device;
receiving available time of the second user from the second electronic device; and
determining the time of the vehicle exchange according to the available time of the first user and the available time of the second user.

18. The electronic device of claim 11, wherein the instructions cause the electronic device further to:
receive a first vehicle-return request from the first electronic device, transmit the first vehicle-return request to the second electronic device, invalidate the virtual key associated with the second vehicle in response to first vehicle-return confirmation being received from the second electronic device, and transmit the first vehicle-return confirmation to the first electronic device; and
receive a second vehicle-return request from the second electronic device, transmit the second vehicle-return request to the first electronic device, invalidate the virtual key associated with the first vehicle in response to second vehicle-return confirmation being received from the first electronic device, and transmit the second vehicle-return confirmation to the second electronic device.

19. The electronic device of claim 18, wherein the instructions cause the electronic device further to:

receive a vehicle-takeback request from the first electronic device;
transmit the vehicle-takeback request to the second electronic device;
invalidate the virtual key associated with the first vehicle in response to vehicle-takeback confirmation being received from the second electronic device; and
transmit the vehicle-takeback confirmation to the first electronic device.

20. The electronic device of claim 11, wherein the instructions cause the electronic device further to:
receive an unlock instruction for the second vehicle from the first electronic device, the unlock instruction comprising the virtual key associated with the second vehicle and a face image;
determine whether the face image matches a pre-stored face image of the first user and the virtual key associated with the second vehicle is valid; and
transmit the unlock instruction to the second vehicle in response to determining that the face image matches the pre-stored face image of the first user and the virtual key associated with the second vehicle is valid.

* * * * *